United States Patent
Matsumoto

(10) Patent No.: US 9,645,471 B2
(45) Date of Patent: May 9, 2017

(54) DRIVING CIRCUIT AND DRIVING METHOD FOR VOICE COIL MOTOR, AND LENS MODULE AND ELECTRONIC DEVICE USING THE SAME

(71) Applicant: ROHM CO., LTD., Kyoto (JP)

(72) Inventor: Kazuhiro Matsumoto, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 348 days.

(21) Appl. No.: 14/289,986

(22) Filed: May 29, 2014

(65) Prior Publication Data

US 2014/0355119 A1   Dec. 4, 2014

(30) Foreign Application Priority Data

May 31, 2013   (JP) .................................. 2013-116086

(51) Int. Cl.
G03B 5/00 (2006.01)
G02B 7/08 (2006.01)
G02B 27/64 (2006.01)
G03B 3/10 (2006.01)

(52) U.S. Cl.
CPC ................. G03B 5/00 (2013.01); G02B 7/08 (2013.01); G02B 27/646 (2013.01); G03B 3/10 (2013.01)

(58) Field of Classification Search
CPC ........... G03B 5/00; G02B 7/08; G02B 27/646
See application file for complete search history.

(56) References Cited

U.S. PATENT DOCUMENTS

| 5,544,080 A * | 8/1996 | Kobayashi | G10K 11/1784 381/71.11 |
|---|---|---|---|
| 2007/0263310 A1* | 11/2007 | Ikeda | G11B 20/10009 360/39 |
| 2008/0007271 A1* | 1/2008 | Smith | G11B 5/5526 324/601 |
| 2009/0102403 A1* | 4/2009 | Lule | H02P 25/034 318/135 |
| 2009/0160950 A1* | 6/2009 | Watanabe | H04N 5/23248 348/208.4 |
| 2010/0201301 A1* | 8/2010 | Lyden | H02P 25/034 318/629 |
| 2011/0279692 A1* | 11/2011 | Hirayama | G03B 13/36 348/208.2 |
| 2013/0320902 A1* | 12/2013 | Sugie | H02P 29/00 318/450 |

FOREIGN PATENT DOCUMENTS

| JP | 9-298430 A | 11/1997 |
|---|---|---|
| JP | 2004-12492 A | 1/2004 |
| JP | 2008-43171 A | 2/2008 |
| JP | 2008-113506 A | 5/2008 |

\* cited by examiner

*Primary Examiner* — Shawki S Ismail
*Assistant Examiner* — Muhammad S Islam
(74) *Attorney, Agent, or Firm* — Cantor Colburn LLP

(57) ABSTRACT

Vibration is suppressed in a feedback type VCM actuator. A converting unit converts a position command value into an internal command value varied based on a waveform having a period which is half of a period of a trigonometric function, the position command value being indicative of a position of a mover and changeable step by step. A driving unit receives a position detection value indicating a current position of the mover from a sensor and drives a voice coil motor such that the position detection value matches the internal command value.

11 Claims, 6 Drawing Sheets

DRIVING CIRCUIT AND DRIVING METHOD FOR VOICE COIL MOTOR, AND LENS MODULE AND ELECTRONIC DEVICE USING THE SAME

CROSS-REFERENCE TO RELATED APPLICATION

This application is based upon and claims the benefit of priority from Japanese Patent Application No. 2013-116086, filed on May 31, 2013, the entire contents of which are incorporated herein by reference.

TECHNICAL FIELD

The present disclosure relates to controlling a voice coil motor.

BACKGROUND

Digital still cameras, digital video cameras or electronic devices with imaging function (e.g., mobile phones) are equipped with an actuator for positioning a focusing lens. The actuator may be a stepping motor type, a piezoelectric type, a voice coil motor (VCM) type or the like.

The VCM may generate a driving force in a linear direction depending on a direction of current flowing through its coil. For example, when an H bridge circuit is connected to the VCM, a direction of a coil current can be reversed. With such configuration, a driving force in the positive and negative directions may be obtained.

Such an actuator may employ an open loop type or a feedback type (i.e., closed loop type). The open loop type is configured to supply a driving current to the VCM according to a position command value indicating a target position. The feedback type is configured to generate a position detection value indicating a position of a mover of VCM using a hall sensor or the like and drive the VCM such that the position detection value matches a position command value.

In an auto-focusing actuator, when a lens is vibrated after being focused by an auto-focus function, an image deteriorates and/or includes noise. Therefore, there is a need to suppress vibration after moving the lens.

In an actuator of the open loop type, a resonant frequency component is removed from a VCM driving signal and vibration is suppressed by driving the VCM with a driving signal containing no resonant frequency component.

The present inventor has studied feedback type actuators and has come to recognize the following problem. In this actuator, a position command value from a microprocessor is changed step by step. Accordingly, when a VCM driving circuit drives a VCM with a driving signal having the same waveform as the position command value, the driving signal contains a harmonic component which causes vibration of a mover after the mover is moved. Such vibration of the mover due to the harmonic component has not yet been recognized by those skilled in the art but recognized by the present inventor.

SUMMARY

The present disclosure provides some embodiments of a driving circuit which is capable of suppressing vibration in a VCM actuator of a feedback type.

According to one embodiment of the present disclosure, there is provided a driving circuit of a voice coil motor having a mover, including a converting unit configured to convert a position command value into an internal command value varied based on a waveform having a period which is half of a period of a trigonometric function, the position command value being indicative of a position of the mover and changeable step by step, and a driving unit configured to receive a position detection value indicating a current position of the mover from a sensor and drive the voice coil motor such that the position detection value matches the internal command value.

According to this embodiment, since a driving signal supplied to the voice coil motor has a single spectrum containing no harmonic component, it is possible to suppress vibration of the mover after the mover is moved.

The converting unit may include an FIR (Finite Impulse Response) filter.

The FIR filter may include N×2 delay elements connected in series, N first coefficient circuits, which correspond respectively to N first half delay elements among the N×2 delay elements, configured to multiply input signals of the respective N first half delay elements by respective individual coefficients, N second coefficient circuits, which correspond respectively to N second half delay elements among the N×2 delay elements, configured to multiply output signals of the respective N second half delay elements by respective individual coefficients, and an adder circuit configured to add an output of each of the N first coefficient circuits, an output of an N-th delay element and an output of each of the N second coefficient circuits. A coefficient $C_i$ of an i-th ($1 \leq i \leq N$) first coefficient circuit, which is the same as a coefficient of an (N−i+1)-th second coefficient circuit, is calculated in accordance with the following equation: $C_i = \{\cos(\pi \cdot i/(N+1) - \pi) + 1\}/2$.

According to this embodiment, an internal command value varied according to the trigonometric function can be generated.

Delay time of the delay elements may be set by an external means.

Since the period of the trigonometric function is proportional to the delay time of the delay elements, a speed of movement of the mover can be adjusted. In addition, since types of voice coil motors of driving symmetry and weights of loads connected to the voice coil motors are different for different platforms, feedback loop bandwidths are also different for different platforms. By varying the period of the trigonometric function, the driving circuit can be used in a variety of platforms.

A transition frequency, which is a reciprocal of the period of the trigonometric function, may be set to fall within a loop bandwidth.

The period of the trigonometric function or the transition frequency may be set by an external means.

Since types of voice coil motors of driving symmetry and weights of loads connected to the voice coil motors are different for different platforms, feedback loop bandwidths are also different for different platforms. By varying the period of the trigonometric function, the driving circuit can be used in a variety of platforms.

The converting unit may include a table storing a trigonometric function waveform and converts the position command value into the internal command value by reading the trigonometric function waveform from the table when the position command value is changed.

The driving circuit may be integrated on a single semiconductor substrate.

According to another embodiment of the present disclosure, there is provided a lens module including a focusing lens, a voice coil motor including a mover which is connected to the focusing lens, a sensor configured to generate a position detection value indicating a position of the mover, and the above-described driving circuit which drives the voice coil motor based on the position command value from an external processor and the position detection value from the sensor, the position command value being indicative of the position of the mover and changeable step by step.

According to another embodiment of the present disclosure, there is provided an electronic device including the above-described lens module, and an imaging unit configured to image light passing through the lens module.

According to another embodiment of the present disclosure, there is provided a lens module including a camera shake correcting lens, a voice coil motor including a mover which is connected to the camera shake correcting lens, a sensor configured to generate a position detection value indicating a position of the mover, and the above-described driving circuit which drives the voice coil motor based on the position command value from an external processor and the position detection value from the sensor, the position command value being indicative of the position of the mover and changeable step by step.

According to another embodiment of the present disclosure, there is provided an electronic device including the above-described lens module, and an imaging unit configured to image light passing through the lens module.

DETAILED DESCRIPTION

Figure 1:
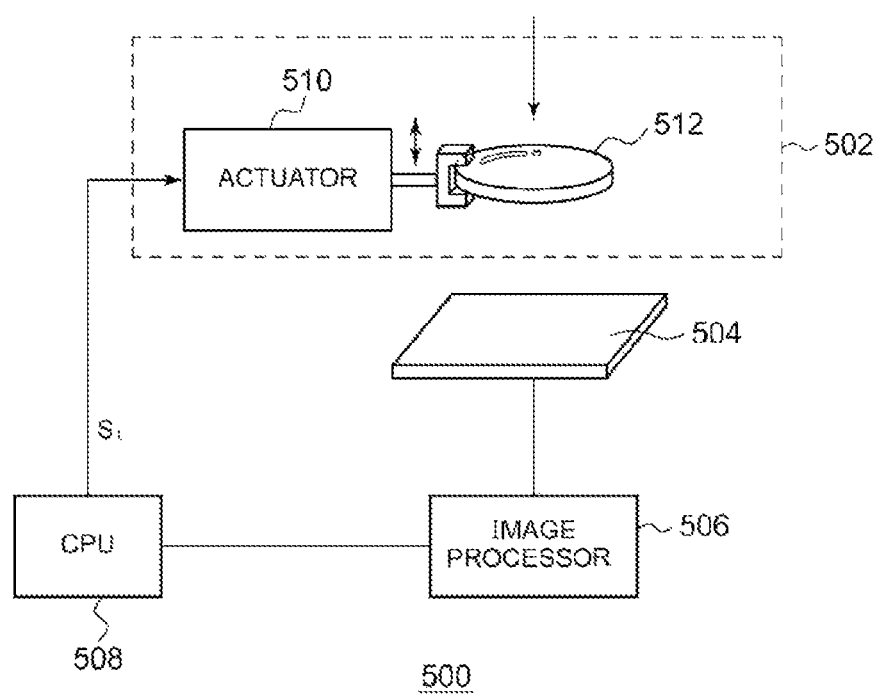
FIG. 1 is a block diagram showing an overall configuration of an electronic device including a driving circuit, according to an embodiment of the present disclosure.

Various embodiments of the present disclosure are described below in detail with reference to the accompanying drawings. Throughout the drawings, the same or similar elements, members and processes are denoted by the same reference numerals and explanation of which may be omitted. The disclosed embodiments are provided for the purpose of illustration, not limited thereto, of the present disclosure, and all features and combinations thereof described in the embodiments cannot be necessarily construed to describe the spirit of the present disclosure.

In the specification, the phrase "connection of a member A and a member B" may include direct physical connection of the member A and the member B as well as indirect connection thereof via other member as long as the other member has no substantial effect on the electrical connection of the member A and the member B or has no damage to functions and effects shown by a combination of the member A and the member B.

Similarly, the phrase "interposition of a member C between a member A and a member B" may include direct connection of the member A and the member C or direct connection of the member B and the member C as well as indirect connection thereof via other member as long as the other member has no substantial effect on the electrical connection of the member A, the member B and the member C or has no damage to functions and effects shown by a combination of the member A, the member B and the member C.

FIG. 1 is a block diagram showing an overall configuration of an electronic device 500, according to an embodiment of the present disclosure. The electronic device 500 may include a driving circuit 100 which will be described later. The electronic device 500 may be, for example, a mobile phone with imaging function, a digital camera, a camcorder, a WEB camera, a tablet PC (Personal Computer) or the like. The electronic device 500 may include a lens module 502, an imaging unit 504, an image processor 506 and a CPU (Central Processing Unit) 508.

The lens module 502 may implement an auto-focus function and include a focusing lens 512 and an actuator 510. The lens 512 is supported to be movable in an optical axial direction. The actuator 510 controls a position of the lens 512 based on a position command value $S_1$ from the CPU 508.

Light (i.e., an image) passing through the lens 512 is incident into the imaging unit 504. The image processor 506 reads image data from the imaging unit 504.

The CPU 508 determines a target position of the focusing lens 512, based on the image read by the image processor 506, such that an image passing through the focusing lens 512 is formed in the imaging unit 504, and outputs the position command value $S_1$ corresponding to the target position to the actuator 510.

The overall configuration of the electronic device 500 according to one embodiment has been described above. Subsequently, the configuration of the lens module will be described in detail.

Figure 2:
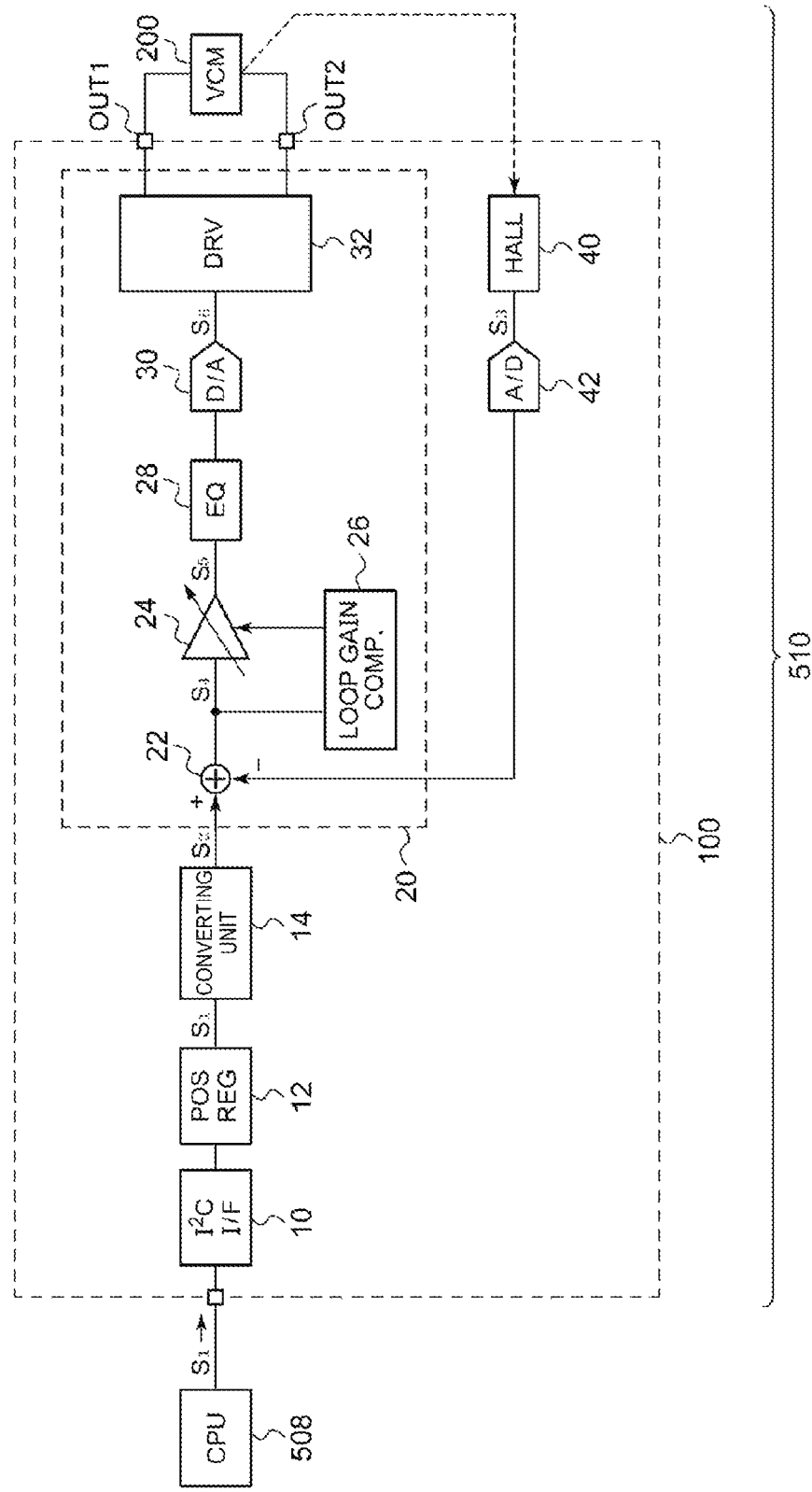
FIG. 2 is a block diagram showing a configuration of an actuator, according to an embodiment of the present disclosure.

FIG. 2 is a block diagram showing a configuration of the actuator 510, according to an embodiment of the present disclosure.

The actuator 510 includes a voice coil motor (VCM) 200 and a driving circuit 100 thereof.

A mover of the voice coil motor 200 is connected to a focusing lens (not shown).

The driving circuit 100 supplies a driving current to a coil of the voice coil motor 200 and controls a position of the mover of the voice coil motor 200. For example, the driving circuit 100 receives the position command value $S_i$ indicating a target position of the mover of the voice coil motor 200 from the CPU 508 and displaces the mover to the indicated target position by supplying a driving current in response to the position command value $S_1$ to the coil of the voice coil motor 200.

The driving circuit 100 includes an interface unit 10, a register 12, a converting unit 14, a driving unit 20, a hall element 40 and an A/D converter 42, all of which may be integrated on a single semiconductor substrate. As used herein, the term "integrated" may include both a case where all elements of a circuit are formed on a semiconductor substrate and a case where main elements of the circuit are integrated on the semiconductor substrate. In addition, some resistors, capacitors and the like for use in adjusting a circuit constant may be provided outside the semiconductor substrate.

The CPU 508 and the interface unit 10 are interconnected via, for example, an I2C (i.e., Inter IC) bus. As described above, the CPU 508 determines a target position of the focusing lens 512 continuously, regularly, or irregularly, and outputs a position command value $S_1$ indicating the target position to the driving circuit 100. The interface unit 10 receives the position command value $S_1$ and records it into the register 12.

The converting unit 14 reads the position command value $S_1$ from the register 12. In other words, the position command value $S_1$ is changed step by step whenever the value is updated by the CPU 508. The converting unit 14 converts the stepwise-changing position command value $S_1$ into an internal command value $S_2$ which varies depending on a waveform having a period Tp/2 that is half of a period Tp of a trigonometric function.

Figure 3A:
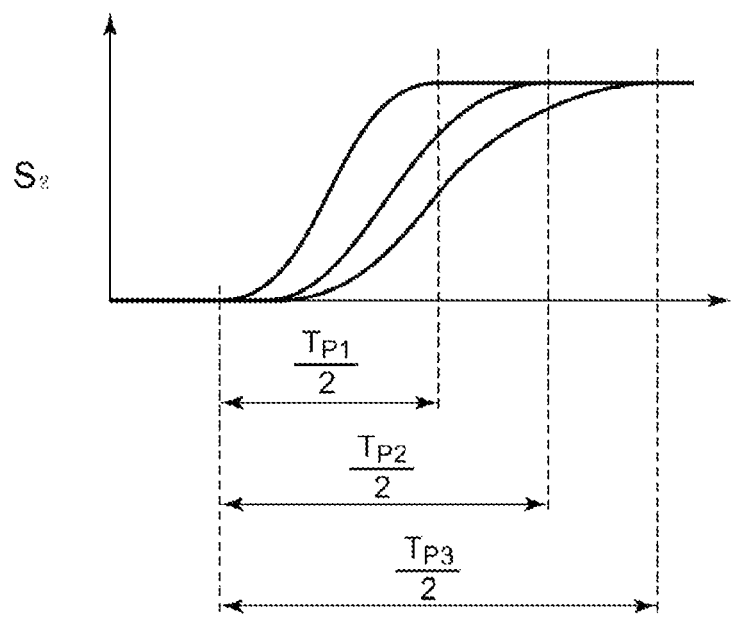
FIG. 3A is a view showing a period Tp, according to an embodiment of the present disclosure.
Figure 3B:
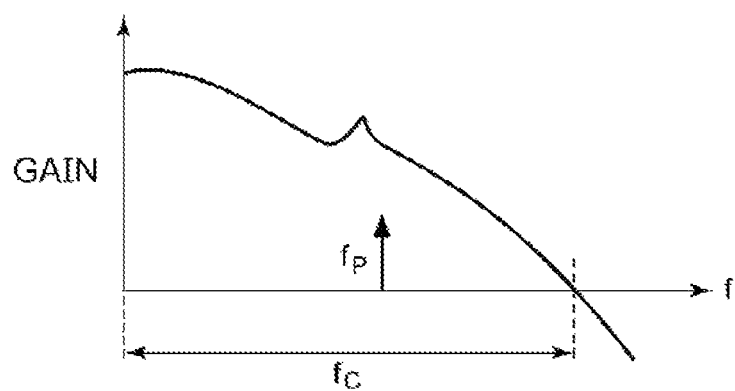
FIG. 3B is a view showing a relationship between a transition frequency fp and a loop bandwidth fc, according to an embodiment of the present disclosure.

A transition frequency fp, which is a reciprocal of the period Tp of the trigonometric function, is set such that the transition frequency fp falls within a loop bandwidth fc of the driving unit 20, but is offset from a resonant frequency of the voice coil motor 200. FIG. 3A is a view showing the period Tp and FIG. 3B is a view showing a relationship between the transition frequency fp and the loop bandwidth fc, according to an embodiment of the present disclosure.

Here, the feedback loop bandwidth fc may be set based on a type of the voice coil motor 200 combined with the driving circuit 100 or a platform equipped with the driving circuit 100. Meanwhile, the period Tp may be set from the outside (for example, a user, an external device, a peripheral device or the like). With such configuration, the driving circuit 100 may have high versatility.

The hall element 40 is a sensor for generating a position detection signal $S_3$ indicating a current position of the mover of the voice coil motor 200. The A/D converter 42 converts the position detection signal $S_3$ received from the hall element 40 into a digital value. The driving unit 20 receives the position detection signal $S_3$ indicating the current position of the mover from the hall element 40 and controls a driving signal, i.e., a level of voltage or an amount of current, to be supplied to the voice coil motor 200 such that the position detection signal $S_3$ matches the internal command value $S_2$.

For example, the driving unit 20 includes a subtractor 22, an amplifier 24, a loop gain controller 26, an equalizer 28, a D/A converter 30 and a driver 32. The subtractor 22 subtracts the position detection value $S_3$ from the internal command value $S_2$ to calculate a difference therebetween (i.e., an error signal) $S_4$. The driving unit 20 feedback-controls the driving signal for the voice coil motor 200 such that the difference $S_4$ decreases to zero. Examples of such feedback control may include P (Proportional) control, PI (Proportional & Integral) control, PID (Proportional, Integral & Differential) control and other controls known in the art. The amplifier 24 generates a control signal $S_5$ by multiplying the error signal $S_4$ by a predetermined coefficient. The loop gain controller 26 adjusts a gain of the amplifier 24. The equalizer 28 is a phase compensation circuit configured to prevent a secondary system from being oscillated during feedback control of the secondary system. The equalizer 28 equalizes the control signal $S_5$ in a suitable manner. The D/A converter 30 converts the control signal $S_5$ into an analog control signal $S_6$. The driver 32 supplies a driving signal based on the control signal $S_6$ to the voice coil motor 200.

Subsequently, a configuration of the converting unit 14 will be described.

Figure 4:
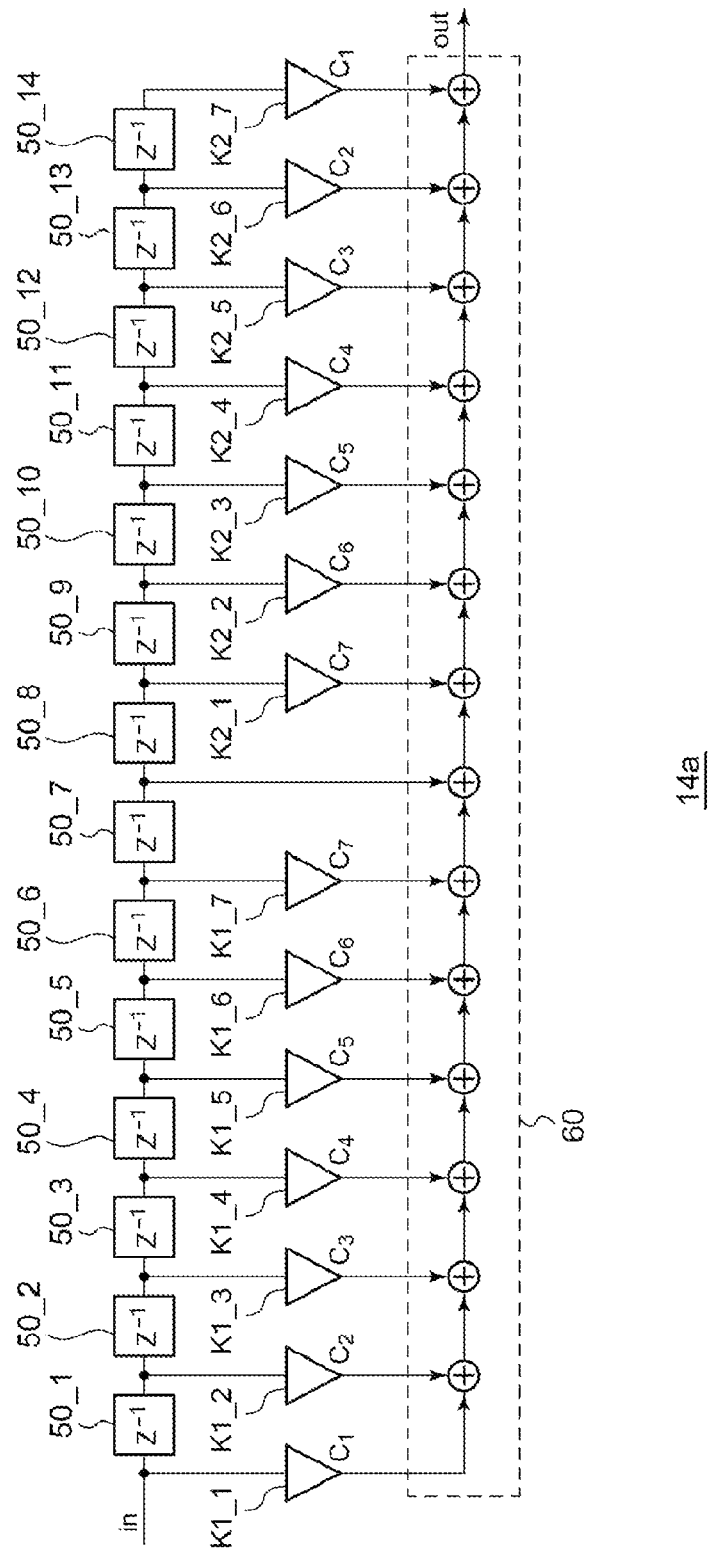
FIG. 4 is a circuit diagram showing an exemplary configuration of a converting unit, according to an embodiment of the present disclosure.

FIG. 4 is a circuit diagram showing an exemplary configuration of the converting unit 14, according to an embodiment of the present disclosure. The converting unit 14 includes, for example, an FIR filter 14a. The FIR filter 14a includes N×2 delay elements 50 connected in series, N first coefficient circuits K1, N second coefficient circuits K2 and an adder circuit 60. FIG. 4 shows a configuration of the FIR filter 14a when N=7.

The N first coefficient circuits K1_1 to K1_7 correspond respectively to the first half N delay elements 50_1 to 50_7 among the N×2 delay elements 50_1 to 50_14. An i-th (1≤i≤N) first coefficient circuit K1_i multiplies an input signal of the corresponding delay element 50_i by an individual coefficient $C_i$.

The N second coefficient circuits K2_1 to K2_7 correspond respectively to the second half N delay elements 50_8 to 50_14 among the N×2 delay elements 50_1 to 50_14. An i-th (1≤i≤N) second coefficient circuit K2_i multiplies an output signal of the corresponding delay element 50_(N+i) by an individual coefficient $C_{N-i+1}$.

The adder circuit 60 adds an output of each of the N first coefficient circuits K1_1 to K1_7, an output of an N-th delay element 50_7 and an output of each of the N second coefficient circuits K2_1 to K2_7.

The coefficient $C_i$ of the i-th (1≤i≤N) first coefficient circuit K1_i, which is the same as the coefficient of the (N−i+1)-th second coefficient circuit, is calculated in accordance with the following equation: $C_i = \cos(\pi \cdot i/(N+1) - \pi) + 1)/2$.

For N=7, Ci satisfies the following equation: $C_i = \{\cos(\pi \cdot (i-8)/8) + 1\}/2$ and coefficients C1 to C7 are calculated as follows.

C1=0.0381
C2=0.1464
C3=0.3087
C4=0.5000
C5=0.6913
C6=0.8536
C7=0.9619

In the FIR filter 14a, a delay time of the delay elements 50 is proportional to the period Tp of the trigonometric function waveform. Therefore, the delay time of the delay elements 50 may be varied. Accordingly, the period Tp can be optimized depending on the use of the driving circuit 100.

The configuration of the driving circuit 100 has been described above. Subsequently, operations of the actuator 510 including the driving circuit 100 will be described.

A feedback loop of the driving unit 20 applies a feedback such that the internal command value $S_2$ matches the position detection value $S_3$, i.e., the position of the mover of the voice coil motor 200 coincides with the target position determined by the CPU 508.

In order to further specify the effects of the driving circuit 100 according to the embodiment, operations performed when the converting unit 14 is assumed to be omitted, i.e., when the internal command value $S_2$ is changed step by step, will be described. When the internal command value $S_2$ is changed step by step, a response speed of the driving unit 20 may not be capable of following the stepwise-changing internal command value $S_2$. Accordingly, ringing and overshoot due to such response delay occur and vibration occurs accordingly even after the mover reaches the target position. In addition, since the internal command value $S_2$ represented as a stepped waveform contains a harmonic wave, the mover is vibrated by a harmonic component thereof.

Subsequently, operations of the driving circuit 100 including the converting unit 14 will be described.

Figure 5:
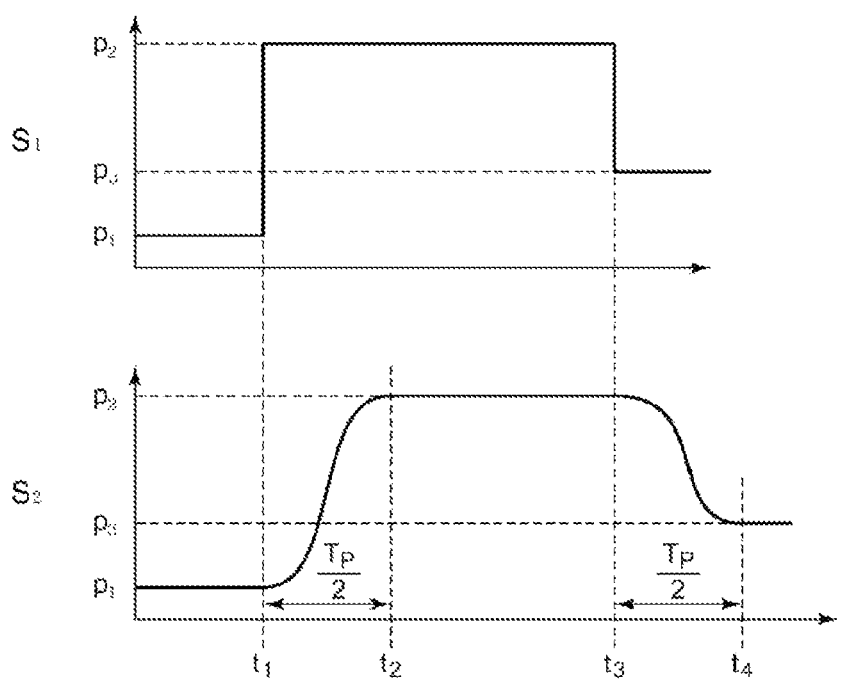
FIG. 5 is a waveform diagram showing operations of a driving circuit shown in FIG. 2, according to an embodiment of the present disclosure.

FIG. 5 is a waveform diagram showing operations of the driving circuit 100 shown in FIG. 2, according to an embodiment of the present disclosure. Before time $t_1$, the position command value $S_1$ takes a current value $p_1$ and the mover is positioned at a position corresponding to the value $p_1$. At time $t_1$, the position command value $S_1$ is changed step by step to a next target value $p_2$. In addition, at time $t_3$, the position command value $S_1$ is changed step by step to the other value $p_3$.

The converting unit 14 converts the position command value $S_1$ represented as the stepped waveform into the internal command value $S_2$ represented as a waveform f(t) changed over the half period Tp/2 that is half of the period Tp of the trigonometric function. At time t=0, when the position command value $S_1$ is changed from the initial value $p_1$ to the target value $p_2$, a waveform f(t) of the position detection value $S_3$ is expressed by the following equation (1).

$$f(t)=p_1+(p_2-p_1)\cdot\{\cos(2\pi(t/T_p)+\pi/2)+1\} \quad (1)$$

The mover of the voice coil motor 200 is moved to a position corresponding to the internal command value $S_2$ having the waveform expressed by the equation (1).

The operations of the actuator 510 have been described above.

In the actuator 510 of FIG. 2, a spectrum contained in the internal command value $S_2$ falls within the feedback loop bandwidth of the driving unit 20. Accordingly, the driving unit 20 can cause the mover to follow the change of the internal command value $S_2$ and displace the position of the mover according to the waveform of the internal command value $S_2$ while suppressing ringing and overshoot of the mover of the voice coil motor 200.

Here, the trigonometric function waveform f(t) contained in the internal command value $S_2$ contains only a single spectrum f=1/Tp. Accordingly, since no undesired harmonic component is contained, it is possible to suppress undesired vibration due to a harmonic wave. In addition, since the transition frequency fp is different from the resonant frequency of the voice coil motor 200, resonance is also suppressed.

In addition, when the converting unit 14 for converting the position command value $S_1$ into the internal command value $S_2$ is incorporated in the driving circuit 100, the CPU 508 may handle the actuator 510 as a black box. In other words, since the CPU 508 provides the position command value S1 indicating the target position of the mover to the driving circuit 100 sequentially regardless of the feedback loop bandwidth, the resonant frequency and so on, the actuator 510 can be easily controlled.

Figure 6:
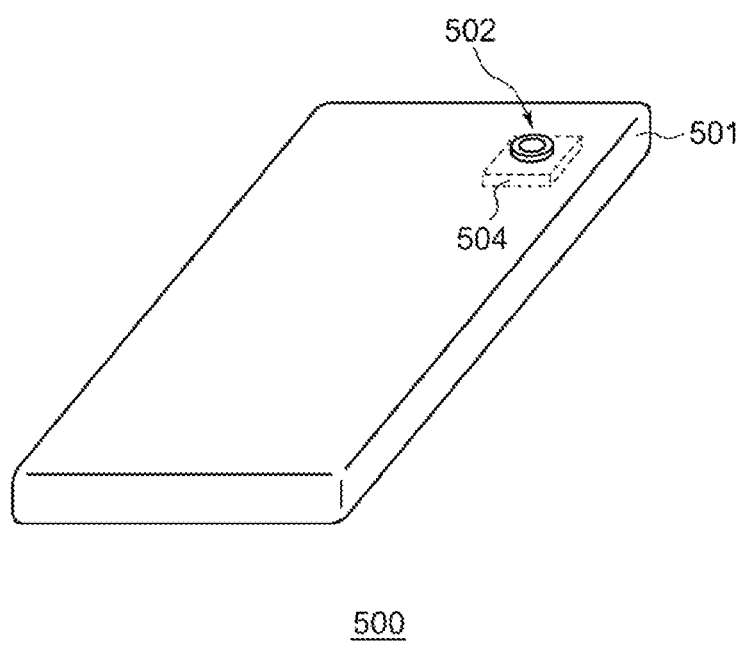
FIG. 6 is a perspective view showing a mobile terminal as one example of the electronic device.

Finally, the electronic device 500 will be described by way of example. FIG. 6 is a perspective view showing a mobile terminal as one example of the electronic device 500. The electronic device 500 includes a housing 501, the lens module 502 and the imaging unit 504. The imaging unit 504 is built in the housing 501. The housing 501 has an opening formed in a portion overlapping the imaging unit 504 and the lens module 502 is installed in the opening. With the electronic device 500 of FIG. 6, auto-focus time can be reduced.

Some specified embodiments of the present disclosure have been described above. However, these embodiments are only illustrative and it is to be understood to those skilled in the art that various modifications to combinations of elements or steps of the embodiments may be made without departing from the scope of the present disclosure, as will be described below.

First Modification

The converting unit 14 may include a table storing the trigonometric function waveform f(t). When the position command value $S_i$ is changed, the converting unit 14 can convert the position command value $S_i$ into the internal command value $S_2$ by reading the trigonometric function waveform f(t) from the table.

Second Modification

Although the focusing lens module has been illustrated in the above embodiments, use of the driving circuit 100 is not limited thereto. For example, the voice coil motor 200 may drive a camera shake correction lens.

Third Modification

The converting unit 14 is not limited to the above-described configuration but may be configured in different ways. For example, the converting unit 14 may be other types of filters.

According to the present disclosure, it is possible to suppress vibration of a mover.

While the present disclosure has been described by way of some embodiments, these embodiments have been provided for the purpose of illustration of principles and applications of the present disclosure. Many modifications and changes in arrangement in the form of the embodiments described herein may be made without departing from the spirit of the disclosures.

What is claimed is:

1. A driving circuit of a voice coil motor having a mover, comprising:
    a converting unit including a table storing a trigonometric function waveform of a trigonometric function having a specific period and configured to convert a position command value into an internal command value varied based on a waveform having a period which is half of the specific period of the trigonometric function by reading the trigonometric function waveform from the table when the position command value is changed, the position command value being indicative of a position of the mover and changeable step by step; and
    a driving unit configured to receive a position detection value indicating a current position of the mover from a sensor and drive the voice coil motor such that the position detection value matches the internal command value,
    wherein a transition frequency, which is a reciprocal of the specific period of the trigonometric function, is set to fall within a loop bandwidth by a loop gain compensation of the driving unit and is offset from a resonant frequency of the voice coil motor, and
    wherein the loop bandwidth of the driving unit is set according to the voice coil motor.

2. The driving circuit of claim 1, wherein the converting unit includes an FIR (Finite Impulse Response) filter.

3. The driving circuit of claim 1, wherein the specific period of the trigonometric function is set by an external means.

4. The driving circuit of claim 1, wherein the driving circuit is integrated on a single semiconductor substrate.

5. A lens module comprising:
a focusing lens;
a voice coil motor including a mover which is connected to the focusing lens;
a sensor configured to generate a position detection value indicating a position of the mover; and
the driving circuit of claim 1, which drives the voice coil motor based on the position command value from an external processor and the position detection value from the sensor, the position command value being indicative of the position of the mover and changeable step by step.

6. A lens module comprising:
a camera shake correcting lens;
a voice coil motor including a mover which is connected to the camera shake correcting lens;
a sensor configured to generate a position detection value indicating a position of the mover; and
the driving circuit of claim 1, which drives the voice coil motor based on the position command value from an external processor and the position detection value from the sensor, the position command value being indicative of the position of the mover and changeable step by step.

7. The driving circuit of claim 2, wherein the FIR filter includes:
N×2 delay elements connected in series;
N first coefficient circuits, which correspond respectively to N first half delay elements among the N×2 delay elements, configured to multiply input signals of the respective N first half delay elements by respective individual coefficients;
N second coefficient circuits, which correspond respectively to N second half delay elements among the N×2 delay elements, configured to multiply output signals of the respective N second half delay elements by respective individual coefficients; and
an adder circuit configured to add an output of each of the N first coefficient circuits, an output of an N-th delay element and an output of each of the N second coefficient circuits,
wherein a coefficient $C_i$ of an i-th ($1 \leq i \leq N$) first coefficient circuit, which is the same as a coefficient of an (N−i+1)-th second coefficient circuit, is calculated in accordance with the following equation:

$$C_i = \{\cos(\pi \cdot i/(N+1) - \pi) + 1\}/2.$$

8. An electronic device comprising:
the lens module of claim 5; and
an imaging unit configured to image light passing through the lens module.

9. An electronic device comprising:
the lens module of claim 6; and
an imaging unit configured to image light passing through the lens module.

10. The driving circuit of claim 7, wherein delay time of the delay elements is set by an external means.

11. A method of driving a voice coil motor having a mover, comprising:
generating a position command value which is indicative of a position of the mover and changeable step by step;
converting the position command value into an internal command value varied based on a waveform having a period that is half of a specific period of a trigonometric function by reading a trigonometric function waveform of the trigonometric function, which is stored in a table, when the position command value is changed;
generating a position detection value indicating a current position of the mover using a sensor; and
controlling a voltage or current supplied to the voice coil motor such that the position detection value matches the internal command value,
wherein a transition frequency, which is a reciprocal of the specific period of the trigonometric function, is set to fall within a loop bandwidth and is offset from a resonant frequency of the voice coil motor, and
wherein the loop bandwidth is set according to the voice coil motor.

* * * * *